Nov. 27, 1934.　　　L. J. TETLOW　　　1,982,035
AIRPLANE BRAKE
Filed Aug. 7, 1931
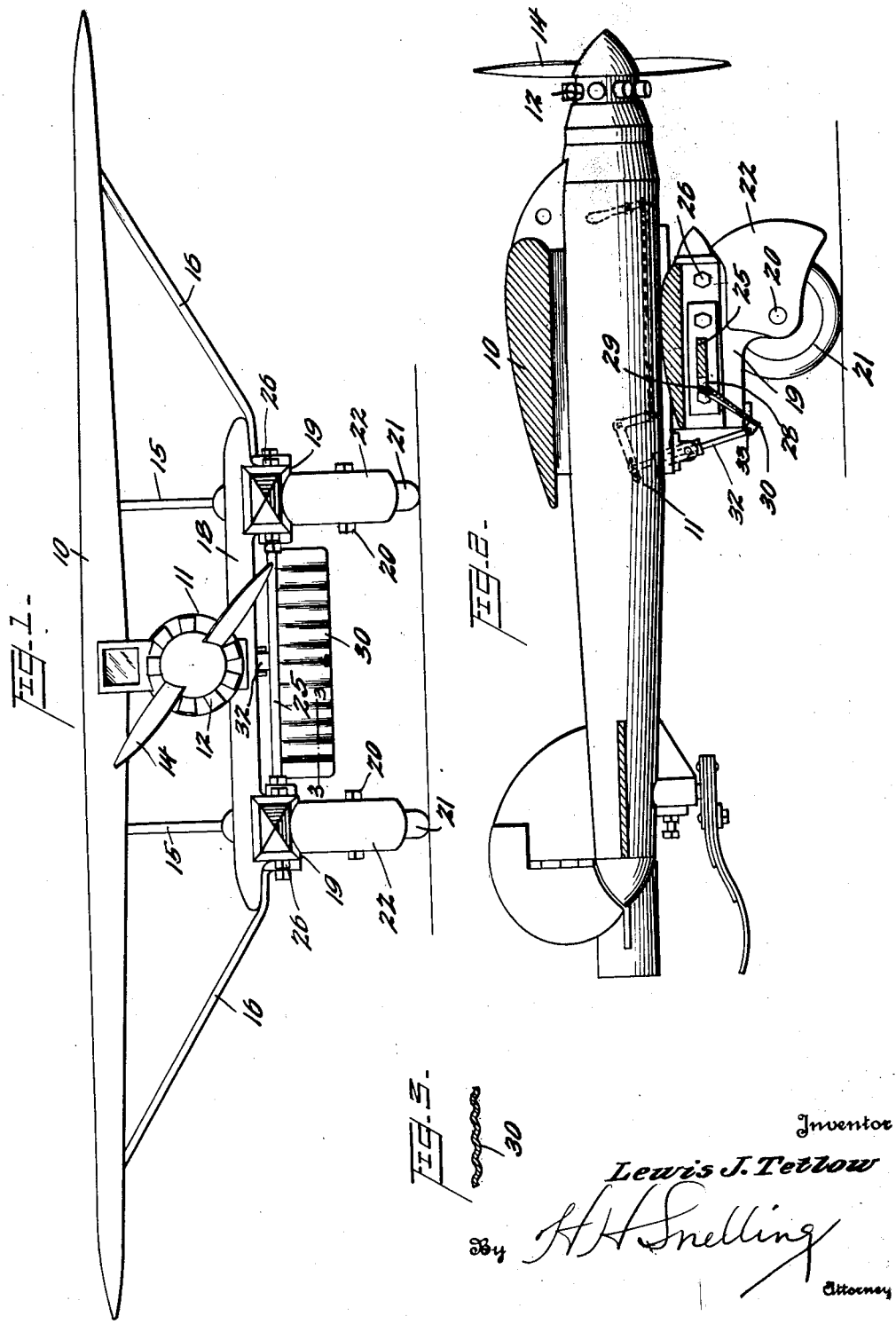
Inventor
Lewis J. Tetlow
By H. H. Snelling
Attorney Patented Nov. 27, 1934

1,982,035

UNITED STATES PATENT OFFICE 1,982,035

AIRPLANE BRAKE

Lewis J. Tetlow, Holyoke, Mass.

Application August 7, 1931, Serial No. 555,839

7 Claims. (Cl. 244—29)

This invention relates to airplanes and has for its principal object the provision of a device for slowing the speed of the airplane in landing so that the propellers can be left running and the speed of the airplane be lowered much more quickly than it is now possible in order to land in a smaller space than now required.

A further object of the invention is the provision of a braking plane located below the fuselage and between the wheels so as to pocket an appreciable quantity of air and located in such manner as to facilitate landing.

A very appreciable number of devices for decreasing the speed of an airplane in landing have been proposed but these devices have not gone into practical use because of certain defects in their construction or location. For example, if the braking planes are located adjacent to the wings there is too much danger of tipping the machine and causing a serious accident. In other cases the location of the braking surface has been too far forward of the center of gravity and this causes undesired movement of the plane. In still other devices no provision has been made to prevent the forming of a pocket which could catch rain or sleet and freeze the device. In my opinion it is quite essential that the plane be so located as not to interfere with the normal flight of the airplane and shall be located substantially beneath the center of gravity.

In the drawing:

Figure 1 is a front elevation of an airplane embodying my invention.

Figure 2 is a central longitudinal section.

The airplane is of general orthodox construction including main wing 10, fuselage 11, engine 12, propellers 14, vertical struts 15, and wing braces 16, both of the latter as well as the fuselage being secured to the main horizontal beam or wing 18 of the landing gear from which downwardly extend two wheels carrying frames 19 thru which, on the pivots 20, are carried the ground wheels 21 which are shielded forwardly by the air deflectors or boots 22.

Spaced appreciably below the main beam 18 of the landing gear is a smaller beam 25 joining each of the supports for the wheel carrying frames 19 which latter are pivoted on the axes 26 in well known fashion. Extending rearwardly from the horizontal bar or beam 25 of the landing gear is a series of brackets 28 preferably integral with the bar 25 and in these brackets is pivoted as at 29 a brake 30, the purpose of the extending brackets 28 being to space the pivot 29 a slight distance rearwardly of the bar 25 so as to minimize the danger from freezing.

The brake 30 is preferably a rectangular corrugated member and as shown is pivoted along one of its longer edges. The hinge, being on the bar 25 which itself is spaced below the landing gear wing 18 and therefore below the fuselage, is spaced below the fuselage and is located at a point substantially below the center of gravity of the entire machine at a slight amount to the rear of the transverse plane which contains the center of gravity. The hinge consequently is to the rear of the ground wheel axles 20 and in fact is approximately in line with the rear edges of the wheels and also approximately at the same horizontal level as the tops of the wheels. The brake in addition to being corrugated is preferably stream lined being thicker at the front than towards the rear. In this manner a slight lifting effect is had by the brake when it is horizontal as in the flying position. A rod 32 is pivoted at one end as at 33 to the brake at a point near the rear edge of the brake and about in the longitudinal center line of the brake. The rod 32 is operated in any desired manner, for example, I prefer to have it connected with a compressed air piston, not shown, altho obviously any other power means for moving this rod can be employed.

When the brake is in vertical position an air pocket is formed, the rear surface of which is formed by the brake and the two side surfaces of which are formed by the inside faces of the wheel boots, the lower surface being formed by the ground while the upper surface is formed by the lower face of the landing gear wing. This air pocket is entirely open at the front and its volume is obviously determined solely by the angle of the brake. As a natural consequence the braking effect can be regulated to extreme nicety by the pedal and can be released instantly.

What I claim is:

1. In an airplane, a fuselage, a landing gear including a horizontal beam and downwardly extending wheel carrying members, a bar spaced below and parallel with said horizontal beam, and a brake pivoted to said bar and between said members.

2. The device of claim 1 in which the brake is corrugated.

3. The device of claim 1 in which the brake is stream lined and is corrugated.

4. The device of claim 1 in which the brake is pivoted at the rear of the bar and said pivot is substantially at the same horizontal level as the top of the wheels and in a vertical plane substantially at the rear of the wheels.

5. In an airplane, a fuselage, a landing gear wing supporting said fuselage, two parallel wheel carrying members extending downwardly from said landing gear wing, and a rectangular brake pivoted below said landing gear wing and near the rear edge thereof, said brake being pivoted along one long edge and adapted to move about its pivot so that it shall form the rear surface of an air chamber bounded at the top by the landing gear wing and at the two sides by the two wheel carrying members and at the rear by said brake.

6. In an airplane having a pair of landing means spaced laterally of and below the fuselage, a brake consisting of a member pivoted about one edge and adapted to swing between said landing means, said pivot being located below the fuselage, above the landing means and substantially below the center of gravity, and upwardly and rearwardly extending bodies for carrying the landing means and forming planes on each side of the brake.

7. The device of claim 6 in which said bodies are parallel to the axis of the fuselage and said pivot is slightly in the rear of the forward landing gear.

LEWIS J. TETLOW.